United States Patent
Kurata

(10) Patent No.: US 8,663,486 B2
(45) Date of Patent: Mar. 4, 2014

(54) METHOD OF MANUFACTURING A MAGNETIC RECORDING MEDIUM

(75) Inventor: Noboru Kurata, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 287 days.

(21) Appl. No.: 12/620,207

(22) Filed: Nov. 17, 2009

(65) Prior Publication Data

US 2010/0133229 A1    Jun. 3, 2010

(30) Foreign Application Priority Data

Nov. 17, 2008 (JP) ................................ 2008-293581

(51) Int. Cl.
*B44C 1/22* (2006.01)

(52) U.S. Cl.
USPC ...... 216/22; 216/37; 204/192.32; 204/192.34

(58) Field of Classification Search
USPC .............. 216/22, 37; 204/192.34, 192.32
See application file for complete search history.

(56) References Cited

U.S. PATENT DOCUMENTS

| | | | |
|---|---|---|---|
| 5,397,644 A * | 3/1995 | Yamashita | 428/408 |
| 6,483,663 B2 * | 11/2002 | Okada et al. | 360/125.62 |
| 7,662,264 B2 * | 2/2010 | Shirotori et al. | 204/192.34 |
| 7,686,972 B2 * | 3/2010 | Hieda et al. | 216/67 |
| 7,967,993 B2 * | 6/2011 | Isowaki et al. | 216/22 |
| 2005/0287397 A1 * | 12/2005 | Soeno et al. | 428/831 |
| 2007/0172584 A1 | 7/2007 | Kihara et al. | |
| 2008/0078739 A1 | 4/2008 | Hibi et al. | |

FOREIGN PATENT DOCUMENTS

| | | |
|---|---|---|
| JP | 04-310621 A | 11/1992 |
| JP | 2006-012285 A | 1/2006 |
| JP | 2007-200422 A | 8/2007 |
| JP | 2008-090881 A | 4/2008 |

* cited by examiner

*Primary Examiner* — Nadine Norton
*Assistant Examiner* — Maki Angadi
(74) *Attorney, Agent, or Firm* — Rabin & Berdo, P.C.

(57) ABSTRACT

A method of manufacturing a magnetic recording medium, includes, in the order recited, the steps of forming a mask protective film composed of carbon on a magnetic layer; forming a resist with a predetermined pattern on the mask protective film; forming a protective mask by etching the mask protective film using the resist as a mask; forming protrusions and recesses on a magnetic layer by etching the magnetic layer using the resist and the protective mask as masks; removing the protective mask, including removing the mask protective film comprised of carbon, using ultraviolet light with a principal wavelength not longer than 340 nm; and forming a protective layer on the magnetic layer having the protrusions and recesses formed thereon.

10 Claims, 2 Drawing Sheets

METHOD OF MANUFACTURING A MAGNETIC RECORDING MEDIUM

CROSS-REFERENCE TO RELATED APPLICATION

This application is based on, and claims priority from, Japanese Patent Application No. 2008-293581, filed on Nov. 17, 2008, the contents of which are incorporated herein by reference in their entirety.

BACKGROUND OF THE INVENTION

1. Field of the Invention

The present invention relates to a method of manufacturing a magnetic recording medium.

2. Description of the Related Art

Among various efforts to enhance recording density of magnetic recording media, a discrete track medium (hereinafter referred to as DTM) has been proposed in which irregularities (protrusions and recesses) are formed along a track direction on the recording surface to reduce magnetic interference between tracks and increase track density, thereby enhancing the recording density.

In some of the techniques for the discrete track medium, a pattern of protrusions and recesses is formed on a resist, and using the resist pattern by way of etching technique (mask pattern formation), isolation is achieved in the track direction in the magnetic layer. A protective layer is deposited and recesses are filled as needed.

Japanese Unexamined Patent Application Publication No. H04-310621 discloses a magnetic recording medium having a high permeability layer and a magnetic layer on a substrate, in which void areas absent of the high permeability layer and the magnetic layer are provided between tracks for recording/reproduction, to ensure the avoidance of mixing of records between the adjacent tracks on reproduction.

Japanese Unexamined Patent Application Publication No. 2006-012285 discloses a magnetic recording medium that comprises a substrate, a soft magnetic layer formed on the substrate, and a recording layer formed over the soft magnetic layer through an intermediate layer, the recording layer being divided into multiple recording elements with a predetermined pattern of protrusions and recesses.

It is asserted that cross-talk to adjacent tracks in a recording/reproduction process is eliminated and degradation of recording/reproduction performances is avoided by means of the invention of Japanese Unexamined Patent Application Publication No. 2006-012285 due to the provision of the pattern of protrusions and recesses.

The DTMs produced by way of the techniques described above are asserted to allow utilization of a commonly used raw material as a magnetic recording medium. Thus, these techniques have an advantage in possible utilization of a common magnetic recording medium.

Such a common magnetic recording medium comprises at least a magnetic layer and a protective layer formed on the magnetic layer, provided over a nonmagnetic substrate of glass or aluminum. The protective layer is generally composed a main material of carbon in view of reliability and wear resistance. A DTM is manufactured by forming a mask pattern on a magnetic recording medium (a raw medium that has a protective film on a magnetic layer over a substrate).

The manufacturing process of a DTM as described above, however, includes a step of forming a mask over the magnetic layer and forming protrusions and recesses on the magnetic layer by way of etching.

In conventional techniques, after forming protrusions and recesses on the magnetic layer, a protective film composed of a main material of carbon on the magnetic layer is removed by using oxygen plasma or a release agent containing an oxidant. As a result, degradation of magnetic performance occurs due to damage and oxidation of the magnetic recording layer by the etching process and corrosion of the magnetic recording layer by a residual component of an etching gas or etching solution. While this may be assumed not to eliminate the entire protective film, leaving a very thin film, it is extremely difficult to leave a protective film with a uniform thickness, eliminating unevenness. Therefore, the protective film needs to be completely removed.

SUMMARY OF THE INVENTION

The present invention has been made in view of the above problems and an object of the invention is to provide a method of manufacturing a magnetic recording medium that does not degrade magnetic performance in the manufacturing process, which has been the case in conventional techniques for manufacturing a discrete track medium, and which is a simple process and exhibits excellent productivity.

To accomplish the above objects, a method of manufacturing a magnetic recording medium according to the present invention comprises steps of: forming a mask protective film on a magnetic layer; forming a resist with a predetermined pattern on the mask protective film; forming a protective mask by etching the mask protective film using the resist as a mask; forming protrusions and recesses on a magnetic layer by etching the magnetic layer using the resist and the protective mask as masks; removing the protective mask; and forming a protective layer on the magnetic layer having the protrusions and recesses formed thereon; wherein the magnetic recording medium is not exposed to the atmosphere during a period of time at least from the step of removing the protective mask to the step of forming the protective layer on the magnetic recording medium from which the protective mask has been removed.

The present invention provides a method of manufacturing a high quality discrete track medium avoiding damages in the manufacturing process. Magnetic recording media manufactured by the method of the invention are advantageous for achieving high density recording. The method of manufacturing a magnetic recording medium of the invention does not cause degradation of magnetic performances in the manufacturing process and is a simple manufacturing process. Owing to the absence of irregularities in the inventive method in particular, a flattening process can be eliminated. Thus, the invention provides a magnetic recording medium with excellent performance and efficient productivity.

A method of manufacturing a magnetic recording medium of the invention will be described in the following with reference to the accompanying drawings.

BRIEF DESCRIPTION OF DRAWINGS

FIG. 1A shows forming a resist with a predetermined pattern on the mask protective film;

FIG. 1B shows forming a protective mask by etching the mask protective film using the resist as a mask;

FIG. 1C shows forming protrusions and recesses on the magnetic layer by etching the magnetic layer using the resist and the protective mask as masks;

FIG. 1D shows removing the protective mask to expose the magnetic layer with protrusions and recesses formed thereon; and FIG. 1E shows an example of a structure of a magnetic recording medium obtained by the manufacturing method of the invention.

DETAILED DESCRIPTION OF THE INVENTION

Figure 1A:
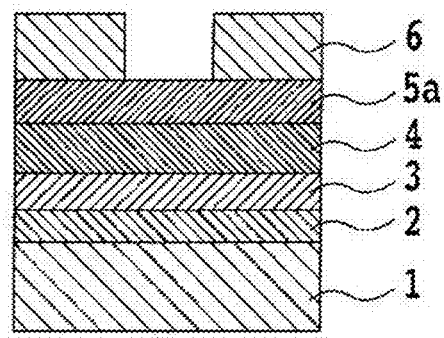
FIG. 1A through 1E are schematic sectional views showing an example of a method of manufacturing a magnetic recording medium according to the invention, where 1 is the substrate, 2 is a soft magnetic layer, 3 is a crystal orientation control layer, 4 is a magnetic layer, 5*a* is a mask protective film, 5*b* is a protective mask, 6 is a resist, and 7 is a protective layer; and where
Figure 1B:
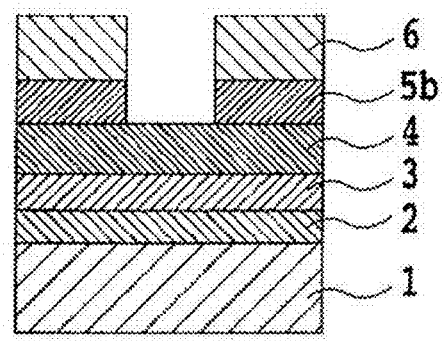
Figure 1C:
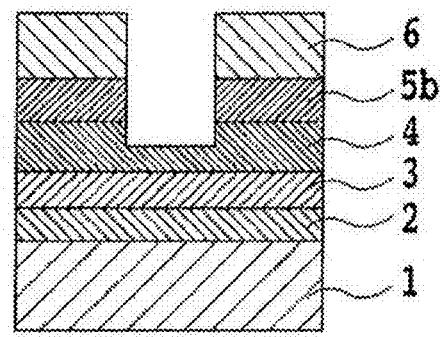
Figure 1D:
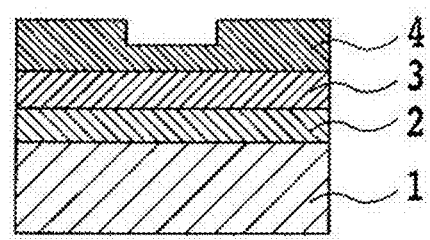
Figure 1E:
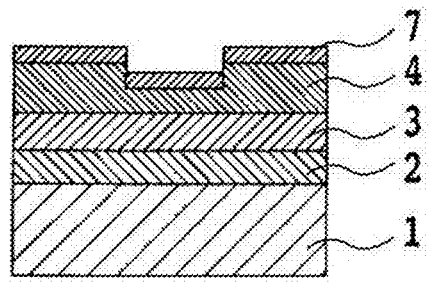

FIG. 1A through 1E are schematic sectional views showing an example of a method of manufacturing a magnetic recording medium according to the invention, in which FIG. 1E shows an example of a structure of a magnetic recording medium obtained by the manufacturing method of the invention.

The magnetic recording medium shown in FIG. 1E is provided with a soft magnetic layer 2, a crystal orientation control layer 3, a magnetic layer 4, and a protective layer 7 on a nonmagnetic substrate 1, in that order. The magnetic layer 4 has a predetermined pattern of protrusions and recesses formed thereon. The magnetic layer can consist of a first magnetic layer and a second magnetic layer.

The nonmagnetic substrate 1 can be composed of any suitable material used in ordinary magnetic recording media, such as NiP-plated aluminum alloy, strengthened glass, or crystallized glass.

The soft magnetic layer 2 is provided for concentrating the magnetic flux generated by a magnetic head and for producing a steep gradient of magnetic field in the magnetic layer 4. While the soft magnetic layer 2 can, for example, be composed of a NiFe alloy or a sendust alloy (FeSiAl), amorphous cobalt alloys such as CoNbZr, CoTaZr and the like in particular give good electromagnetic conversion characteristics to the magnetic recording layer. An optimum thickness of the soft magnetic layer 2 depends on a structure and characteristics of a magnetic head for use in magnetic recording, and preferably in a range of 10 nm to 300 nm from the viewpoint of productivity.

The crystal orientation control layer 3 is provided to favorably control crystal orientation, grain size, and grain boundary segregation in the magnetic layer 4. The crystal orientation control layer 3 is preferably, but not exclusively, mainly composed of ruthenium or a ruthenium alloy and has a thickness controlled in a range of 5 nm to 50 nm.

A magnetic layer 4 will now be described that consists of two shells, a first magnetic layer and a second magnetic layer. The first magnetic layer formed on the crystal orientation control layer 3 is a magnetic layer with a granular structure (a granular magnetic layer) that is composed of magnetic crystal grains vertically oriented on the ruthenium crystals and non-magnetic substances of oxides or nitrides surrounding the magnetic crystal grains.

The first magnetic layer has a granular structure. The ferromagnetic crystal grains in this granular structure are preferably composed of a CoCr alloy. A CoCr alloy with an additive(s) of at least one element selected from Pt, Ni, Ta, and B in particular is preferable for attaining excellent magnetic performances and read/write characteristics.

A preferably useful material for composing the nonmagnetic grain boundaries of the granular magnetic layer is an oxide(s) of at least one element selected from Si, Al, Ti, Ta, Hf, and Zr in order to form a stable granular structure, although not limited to these materials. A thickness of the first magnetic layer is preferably in a range of 5 nm to 60 nm, though not limited to this range.

The second magnetic layer is a magnetic layer with a non-granular structure (a non-granular magnetic layer) that does not include metal oxides or nitrides in the nonmagnetic grain boundaries. The non-granular magnetic layer blocks cobalt atoms dissolving out of the magnetic grains of the underlying granular magnetic layer, thereby ensuring high durability of the medium.

The non-granular magnetic layer is preferably composed of CoCr alloy with an additive(s) of at least one element selected from Pt, Ni, Ta, and B in order to attain excellent magnetic performance and read/write characteristics. A thickness of the non-granular magnetic layer is preferably at most 20 nm in order to secure high durability of the medium, though not limited to this range.

The protective layer 7 can be a conventional commonly used one composed mainly of carbon. The protective layer can be formed by way of sputtering or CVD. A thickness of this layer is preferably in the range of 1 nm to 20 nm.

In a method according to the invention, a raw medium is prepared that comprises: a soft magnetic layer 2, a crystal orientation control layer 3, a first magnetic layer, and a second magnetic layer (the combination of the first and second magnetic layers is referred to as "a magnetic layer 4"), successively formed on a nonmagnetic substrate 1 by way of sputtering; and a mask protective film 5a formed on the magnetic layer 4 in the step of forming a mask protective film by way of sputtering or CVD, thereby producing a raw medium. On the mask protective film 5a, a resist 6 with a predetermined pattern (in the step of forming a resist) is formed as shown in FIG. 1A. The mask protective film 5a can be a conventional commonly used protective film mainly composed of carbon as per the protective layer 7 described above.

A reason for providing the mask protective film 5a in the method of the invention is as follows. If the magnetic layer 4 is etched with a mask of solely the resist 6, it is highly probable that at least a portion of the resist 6 will be eliminated by decomposition, which may cause removal, due to the etching, of a part of the magnetic layer that must be protected by the mask. In contrast, the mask protective layer 5a, when preliminarily formed of a main composition of carbon, is not removed by decomposition in the etching step of the magnetic layer 4. Thus, a pattern of protrusions and recesses can be formed in a desired configuration.

The pattern in the resist can be formed by electron beam machining or an imprinting technique. The former makes a pattern with an electron beam. The latter imprinting technique forms a pattern by pressing a stamper having a predetermined pattern formed thereon onto the resist surface, and is superior in production cost.

A reactive ion etching technique can be used to form a resist pattern by way of etching after forming a uniform resist film. A reactive gas for use in this etching process can be any halogen-containing gas, for example, $CF_4$, $CHF_3$, $CH_2F_2$, $C_3F_8$, $C_4F_8$, $SF_6$, or $Cl_2$.

Then, as shown in FIG. 1B, a protective mask 5b with a pattern the same as the one in the resist 6 is formed by etching the mask protective film 5a using the resist 6 with a pattern formed thereon as a mask (the step of forming a protective mask).

Next, as shown in FIG. 1C, protrusions and recesses are formed on the magnetic layer 4 by etching the magnetic layer 4 using the resist 6 and the protective mask 5b as masks (the step of forming protrusions and recesses). The etching process in the step of forming protrusions and recesses is conducted until the bottoms of the recesses reach the first magnetic layer.

While the resist 6 is simultaneously removed by the etching process in the step of forming protrusions and recesses, if any resist remains after the step of forming protrusions and recesses, the resist can be peeled off by reactive ion etching, for example.

Then, as shown in FIG. 1D, the protective mask 5b is removed to expose the magnetic layer 4 with protrusions and recesses formed thereon (the step of removing a protective mask). The protective mask 5b is removed preferably using ultraviolet light. The protective mask 5b, in the case of a carbon mask, can be removed by conventional techniques of oxygen plasma and ozone through oxidation and evaporation. However, the magnetic layer 4 is also oxidized causing degradation of signal quality. Thus, those conventional techniques are inappropriate.

The carbon mask has a carbon-carbon bond, the binding energy of which is 85.7 kcal/mol. Irradiation with ultraviolet light having an energy higher than this binding energy can decompose and evaporate the carbon without oxidation. Ultraviolet light with a wavelength not larger than 340 nm has such a high energy.

Such ultraviolet light can be generated by low pressure mercury lamps with wavelengths of 254 nm (113 kcal/mol) and 185 nm (155 kcal/mol), and a xenon excimer lamp with monochromatic light of 172 nm (166 kcal/mol). Light sources for ultraviolet light are not limited to the above examples, but any devices are useful that generate ultraviolet light with a wavelength corresponding to an energy value higher than the carbon-carbon binding energy. A luminance of the ultraviolet light lamp is preferably at least 1 nW/cm$^2$, and a distance between the lamp and the substrate is preferably at most 5 mm. A distance larger than 5 mm decreases the illuminance and makes a required illuminance hardly attained.

Then as shown in FIG. 1E, a protective layer 7 is formed for avoiding oxidation of the surface of the magnetic layer to suppress signal degradation. The protective layer 7, when formed of carbon, can be formed by way of CVD or sputtering. The protective layer, when formed of diamond-like carbon, can be formed by way of chemical vapor deposition or physical vapor deposition.

In the method of the invention, the magnetic recording medium is not exposed to the atmosphere during a period of time at least from the step of removing the protective mask to the step of forming the protective layer on the magnetic recording medium from which the protective mask has been removed. This is intended to avoid degradation of the magnetic layer due to oxygen in the atmosphere.

By conducting a procedure from the step of removing a protective mask to the step of forming a protective layer in an environment of an inert gas or a reducing gas, the magnetic recording medium is prevented from being exposed to the atmosphere during a period of time at least from the step of removing the protective mask to the step of forming the protective layer on the magnetic recording medium from which the protective mask has been removed. An inert gas for use in these steps can be argon or nitrogen, and a reducing gas can be hydrogen. Useful gases are not limited to these gases, and any gases can be used that prevent the magnetic layer from being oxidized.

Alternatively, by conducting a procedure from the step of removing a protective mask to the step of forming a protective layer in an environment of a reduced pressure of at most 1,000 Pa, the magnetic recording medium is prevented from being exposed to the atmosphere during a period of time at least from the step of removing the protective mask to the step of forming the protective layer on the magnetic recording medium from which the protective mask has been removed. The gas composition here in the reduced pressure environment can be similar to that of the atmosphere. The reduced pressure is allowably at most 1,000 Pa, and preferably lower than about 100 Pa. By irradiating with ultraviolet light in such an environment as to avoid exposure to the atmosphere, the protective mask can be decomposed and removed while avoiding oxidation of the magnetic layer.

A lubricant layer can be formed on the surface of a magnetic recording medium having a protective layer formed on a magnetic layer having protrusions and recesses formed thereon. The lubricant layer can be a liquid lubricant layer of perfluoropolyether, which can be formed by a dip-coating method.

EXAMPLES

The present invention will be described more in detail with reference to examples of preferred embodiments of the invention. The examples of magnetic recording media were manufactured according to the steps shown in FIG. 1.

Example 1

The substrate 1 used was a chemically reinforced glass substrate (N-5 glass substrate manufactured by HOYA Corporation, for example) having a smooth surface. By means of a sputtering method, the following were deposited: a soft magnetic layer 2 of CoZrNb 200 nm thick, a crystal orientation control layer 3 of NiFeNb 3 nm thick, and ruthenium 14 nm thick thereon.

Then, CoCrPt—$SiO_2$ was deposited to form a first magnetic layer of a granular magnetic layer having nonmagnetic grain boundaries composed of $SiO_2$. Subsequently, a second magnetic layer of CoCrPt alloy 10 nm thick was deposited to obtain a non-granular magnetic layer.

Next, a carbon layer 10 nm thick was deposited to form a mask protective film 5a by way of sputtering. Thus, a raw medium was produced having a soft magnetic layer 2, a crystal orientation control layer 3, a first magnetic layer, a second magnetic layer, and a mask protective film 5a laminated on a substrate 1.

Then, the raw substrate having the layers up to the mask protective film 5a was coated with a resist for electron beam (EB) machining (ZEP-520A manufactured by Nippon Zeon Co. Ltd., for example) to a thickness of 50 nm using a spin coater. After that, drawing by electron beam was carried out on the resist using an EB apparatus.

Then, a development process was carried out with a developing liquid for EB resist (ZEP-RD manufactured by Nippon Zeon Co. Ltd., for example) using a coater-developer device, for patterning the resist. A data area and a servo area were patterned on the resist. The patterning in the data area was conducted in the way of "line & group" along circumferences in every sector. Widths in the line & group were 40 nm for the part of the remained resist and 60 nm for the part of the exposed magnetic recording layer. The servo area was formed so that each island of burst was surrounded by respective isolation part. Thus, a structure of FIG. 1A was produced having a soft magnetic layer 2, a crystal orientation control layer 3, a first magnetic layer, a second magnetic layer, a mask protective film 5a, and a patterned resist film 6 laminated on a substrate 1.

After that, using the etched resist as a mask, the mask protective film 5a was etched by means of a high density plasma etching apparatus of an induction coupled plasma (ICP) system, to form a protective mask 5b. In this etching process, an oxygen gas flow rate was 40 sccm at a pressure of 0.5 Pa, a plasma generation power was 300 W at 13.56 MHz, and a bias power was 20 W.

Then, etching of the magnetic layer 4 was carried out using an ion milling apparatus in conditions of argon gas flow rate of 10 sccm, gas pressure of 0.1 Pa, power of 200 W, and acceleration voltage of 700 V. The gas pressure is preferably at most 0.3 Pa in order to obtain a large taper angle.

Then, the resist film 6 was removed by a reactive ion etching method in the conditions of a plasma generation power of 200 W at 13.56 MHz, zero bias power, a gas flow rate of 40 sccm, and a gas pressure of 1.5 Pa. Subsequently, the protective mask 5b was removed using ultraviolet light. The removal of protective mask 5b was carried out using a xenon excimer UV apparatus with a principal wavelength of 172 nm. A distance between the lamp and the substrate was 2 mm and an illuminance was 1.5 nW/cm$^2$. The process of removing the protective mask 5b was conducted in an environment of nitrogen gas in the UV treatment apparatus that was hermetically sealed and filled with nitrogen gas.

The step of forming protrusions and recesses and the following reactive ion etching process, the step of removing the protective mask, and the next step of forming a protective film were carried out using an apparatus of an in-line construction having vacuum chambers for respective steps and gate valves between adjacent vacuum chambers through vacuum transportation in which the processing article was transported from a chamber to the next chamber by opening the gate valve after adjusting the reduced pressure conditions of the two chambers, preventing the article from being exposed to the atmosphere. In this condition, a protective layer of carbon with a thickness of 4 nm was deposited. Since the step of removing the protective mask was conducted by circulating an inert gas, re-adhesion of decomposed carbon was avoided.

After that, a liquid lubricant layer of perfluoropolyether 2 nm thick was formed by way of dip-coating. Thus, a perpendicular magnetic recording medium was manufactured. Evaluation of signals from the obtained magnetic recording medium was conducted. Table 1 shows the output of reproduced signals and the S/N ratio.

Example 2

A DTM was manufactured in the same procedure as in Example 1 except that the step of removing the protective mask was carried out by ultraviolet light irradiation in an environment under a reduced pressure instead of in the environment of nitrogen gas. The step in Example 2 was carried out using a xenon excimer lamp with a principal wavelength of 172 nm disposed 2 mm away from the substrate in a chamber at a pressure of 20 Pa. Since the ultraviolet light irradiation was conducted in an environment under reduced pressure, the decomposed carbon was exhausted, preventing re-adhesion in this Example 2 as well. Evaluation results for the signals from the obtained magnetic recording medium are given in Table 1 together with the results for Example 1.

Comparative Example 1

A DTM was manufactured in the same procedure as in Example 1 except that the process of removing the resist by way of reactive ion etching and the step of removing the protective mask by ultraviolet light irradiation were replaced by a step of removing the resist and the protective mask by an oxygen plasma treatment. The oxygen plasma treatment was conducted by means of a high density plasma etching apparatus of an induction coupled plasma (ICP) system. A plasma generation power was 300 W at 13.56 MHz and a bias power was zero. A gas flow rate was 50 sccm and a gas pressure was 1 Pa. Evaluation results for the signals from the obtained magnetic recording medium are given in Table 1 together with the results for Examples 1 and 2.

TABLE 1

| | output (mV) | S/N ratio (db) |
| --- | --- | --- |
| Comparative Example 1 | 2.1 | 12 |
| Example 1 | 2.9 | 15.5 |
| Example 2 | 3.1 | 16 |

Table 1 clearly confirms that Examples 1 and 2 according to the invention have exhibited superior performance to the Comparative Example.

It will be appreciated by those skilled in the art that the invention may be carried out otherwise than as described herein without departing from the scope thereof.

What is claimed is:

1. A method of manufacturing a magnetic recording medium, comprising, in the order recited, the steps of:
   (a) forming a mask protective film comprised of carbon on a magnetic layer;
   (b) forming a resist with a predetermined pattern on the mask protective film;
   (c) forming a protective mask by etching the mask protective film using the resist as a mask;
   (d) forming protrusions and recesses on a magnetic layer by etching the magnetic layer using the resist and the protective mask as masks;
   (e) removing the protective mask using ultraviolet light with a principal wavelength not longer than 340 nm to evaporate the protective mask; and
   (f) forming a protective layer on the magnetic layer having the protrusions and recesses formed thereon;
   wherein the magnetic recording medium is not exposed to the atmosphere during a period of time at least from step (e) removing the protective mask to step (f) forming a protective layer.

2. The method of manufacturing a magnetic recording medium according to claim 1, wherein a procedure from the step of removing the protective mask to the step of forming the protective layer is carried out in an environment of an inert gas.

3. The method of manufacturing a magnetic recording medium according to claim 2, wherein the procedure from the step of removing the protective mask to the step of forming the protective layer is carried out in an environment of an inert gas having a reduced pressure of not higher than 1,000 Pa.

4. The method of manufacturing a magnetic recording medium according to claim 1, wherein a procedure from the step of removing the protective mask to the step of forming the protective layer is carried out in an environment having a reduced pressure of not higher than 1,000 Pa.

5. The method of manufacturing a magnetic recording medium according to claim 1, wherein a procedure from the step of removing the protective mask to the step of forming the protective layer is carried out in an environment of a reducing gas.

6. The method of manufacturing a magnetic recording medium according to claim 5, wherein the procedure from the step of removing the protective mask to the step of forming the protective layer is carried out in an environment of a reducing gas having a reduced pressure of not higher than 1,000 Pa.

7. A method of manufacturing a magnetic recording medium, comprising the steps of, in the order recited:
(a) forming a mask protective film comprised of carbon on a magnetic layer;
(b) forming a resist with a predetermined pattern on the mask protective film;
(c) forming a protective mask by etching the mask protective film using the resist as a mask;
(d) forming protrusions and recesses on a magnetic layer by etching the magnetic layer using the resist and the protective mask as masks;
(e) removing the protective mask using ultraviolet light with a principal wavelength not longer than 340 nm to evaporate the protective mask; and
(f) forming a protective layer on the magnetic layer having the protrusions and recesses formed thereon,
wherein oxidation of the magnetic layer is prevented by conducting the method in an environment having a reduced pressure that is not higher than 1,000 Pa, at least from step (e) removing the protective mask to step (f) forming the protective layer and the magnetic recording medium is not exposed to atmosphere during at least that period of time.

8. The method of manufacturing a magnetic recording medium according to claim 7, wherein said environment is one of an inert gas or a reducing gas having said reduced pressure.

9. The method of manufacturing a magnetic recording medium according to claim 8, wherein said environment is an inert gas and the inert gas is argon or nitrogen.

10. The method of manufacturing a magnetic recording medium according to claim 8, wherein said environment is a reducing gas and the reducing gas is hydrogen.

* * * * *